Jan. 22, 1952 L. P. BLACK 2,583,408
SINE BAR GRINDING WHEEL TRUING DEVICE
Filed Oct. 30, 1945 4 Sheets-Sheet 1
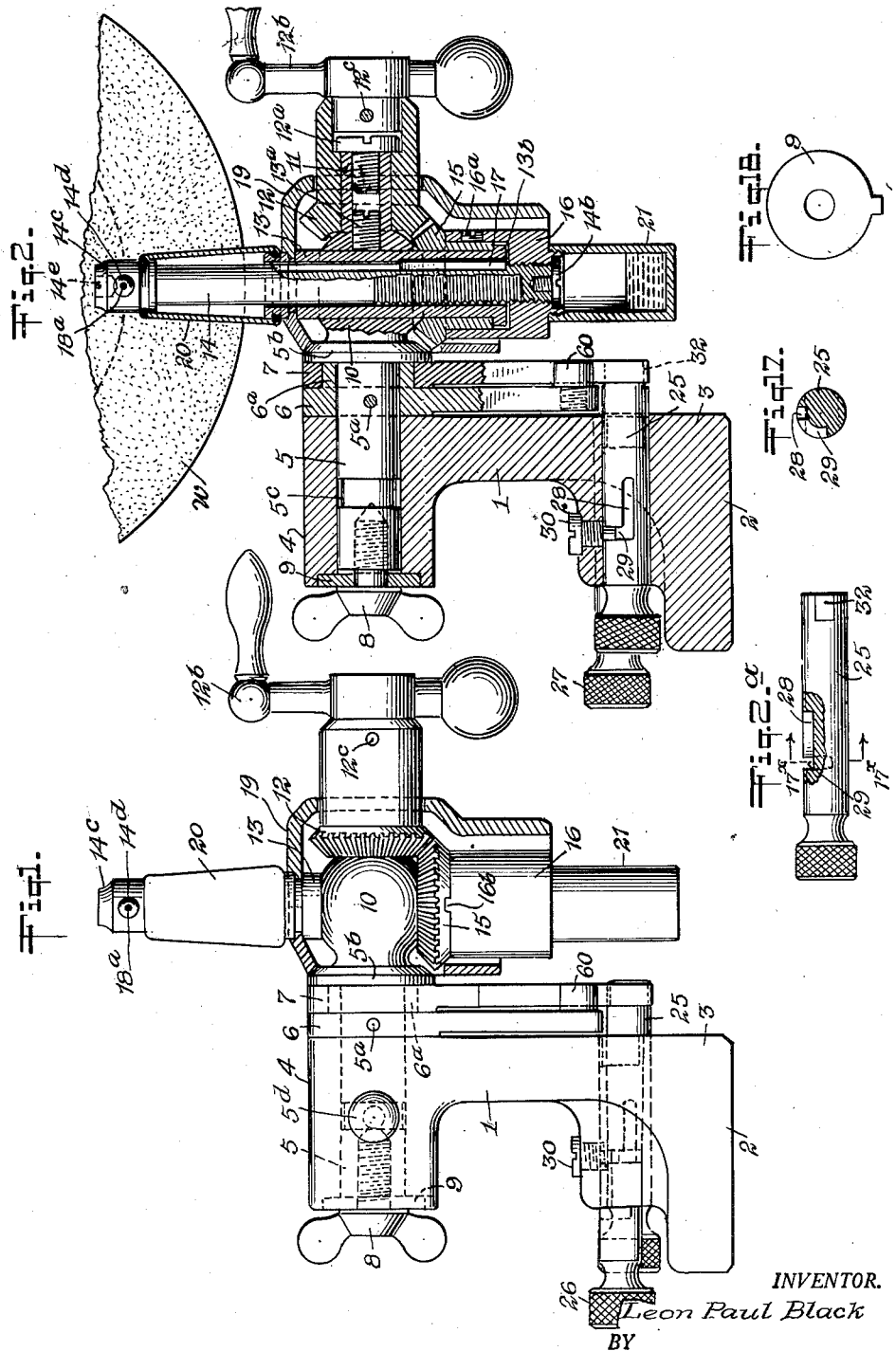
INVENTOR.
Leon Paul Black
BY
Munn, Liddy & Glaccum
Attorneys Jan. 22, 1952 L. P. BLACK 2,583,408
SINE BAR GRINDING WHEEL TRUING DEVICE
Filed Oct. 30, 1945 4 Sheets-Sheet 2
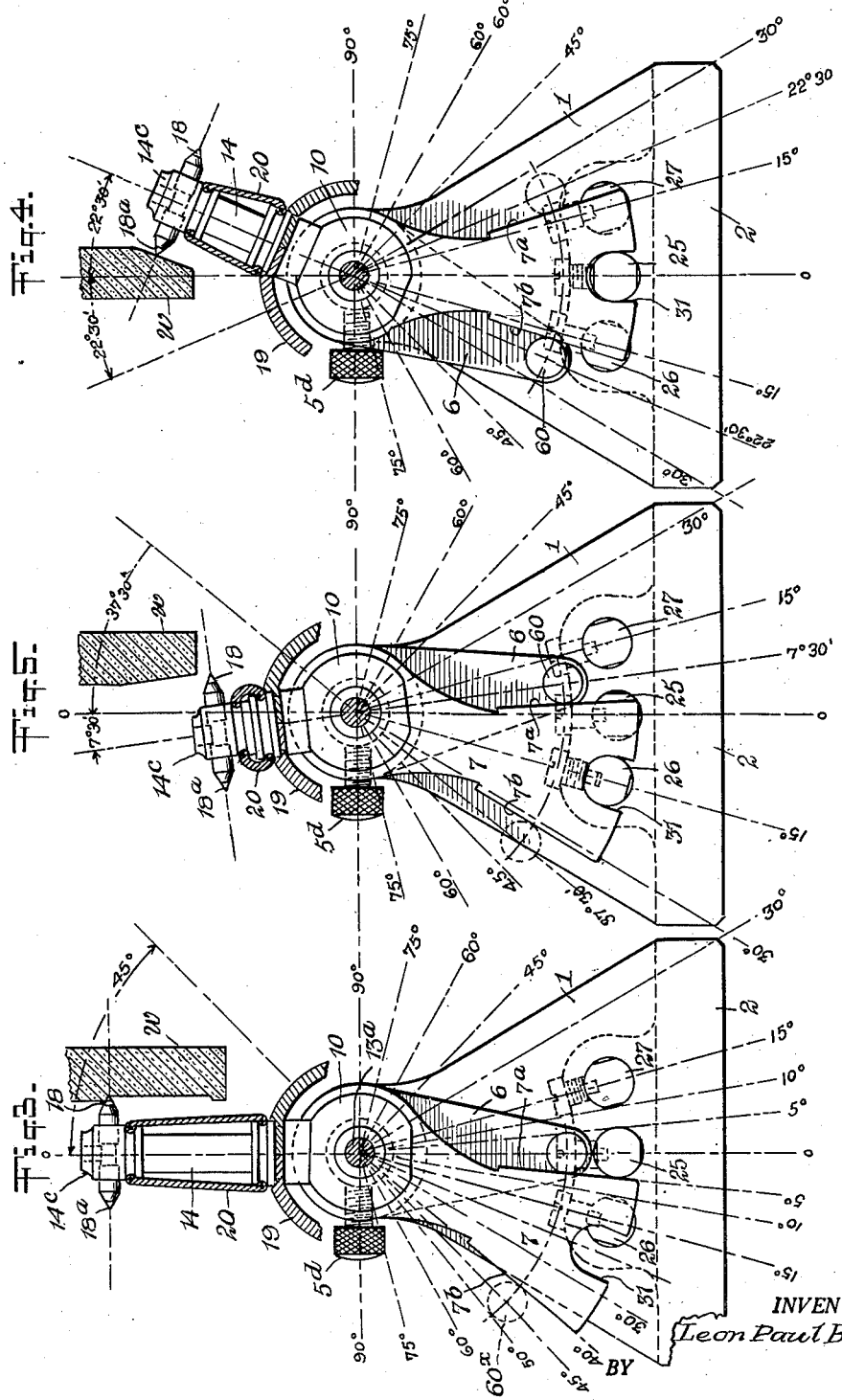
INVENTOR.
Leon Paul Black Jan. 22, 1952 L. P. BLACK 2,583,408
SINE BAR GRINDING WHEEL TRUING DEVICE
Filed Oct. 30, 1945 4 Sheets-Sheet 3
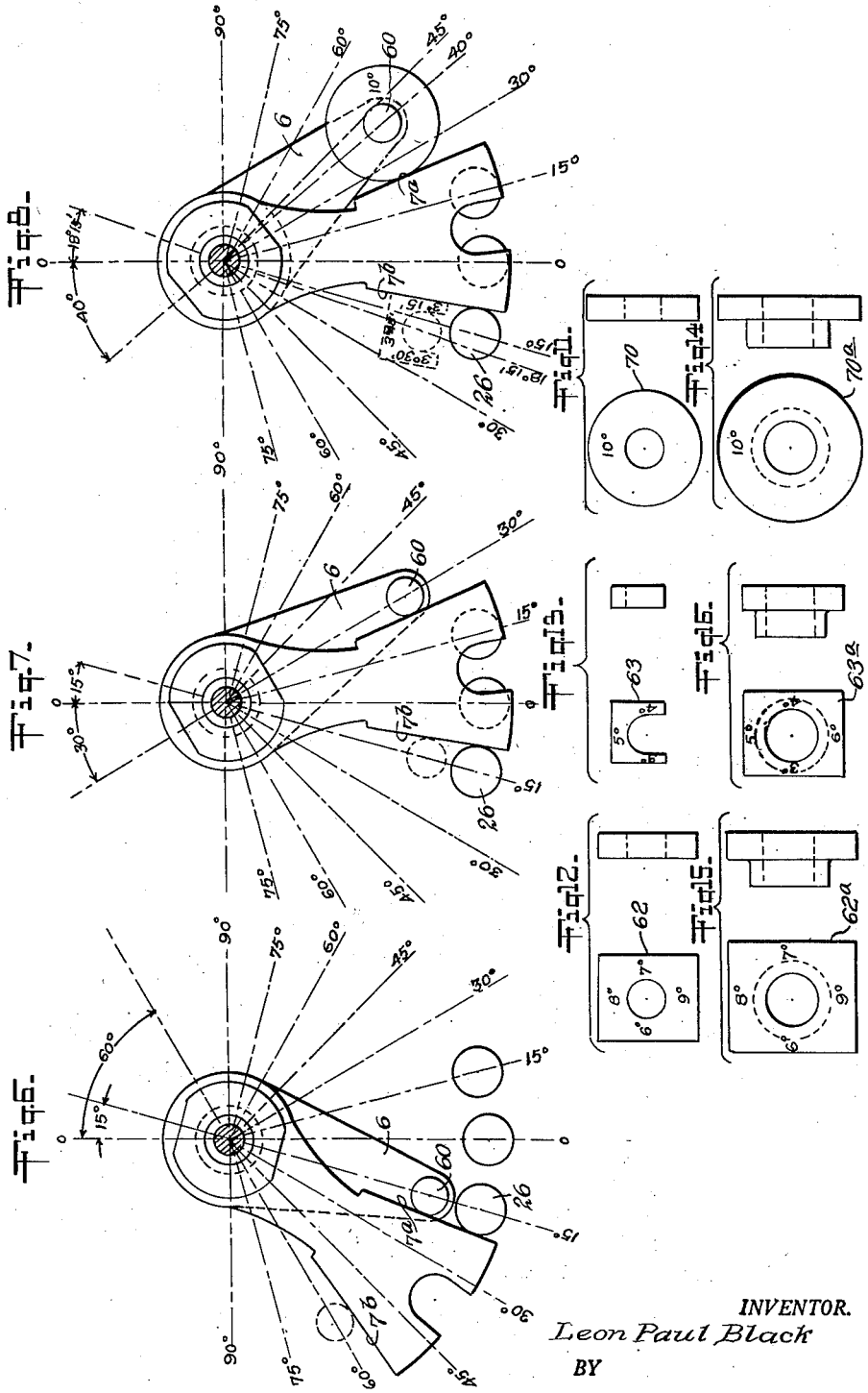
INVENTOR.
Leon Paul Black
BY
Munn, Liddy & Glaccum
Attorneys Jan. 22, 1952 L. P. BLACK 2,583,408
SINE BAR GRINDING WHEEL TRUING DEVICE
Filed Oct. 30, 1945 4 Sheets-Sheet 4
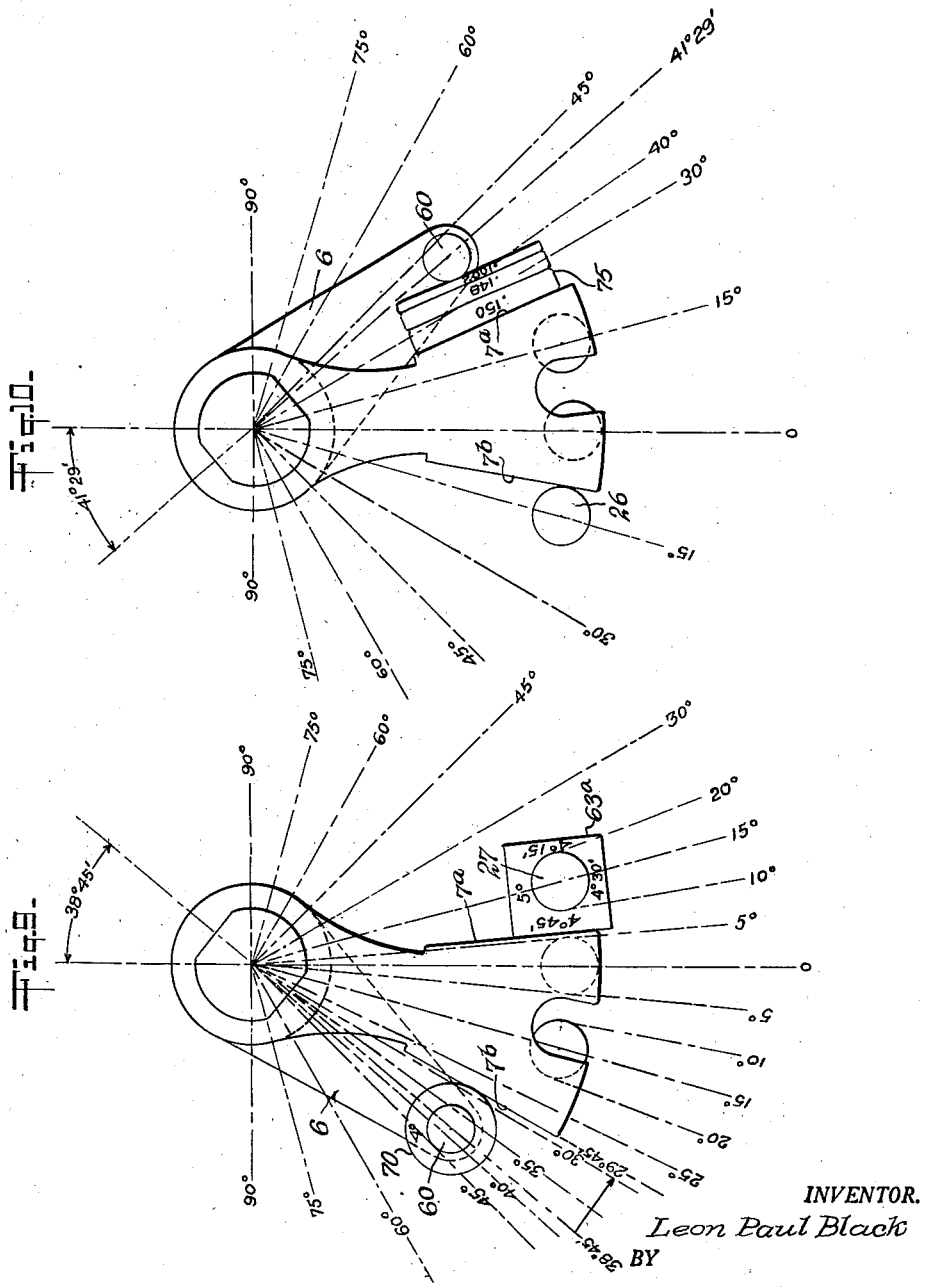
INVENTOR.
Leon Paul Black
BY
Munn, Liddy & Glaccum
Attorneys

Patented Jan. 22, 1952

2,583,408

UNITED STATES PATENT OFFICE 2,583,408

SINE-BAR GRINDING WHEEL TRUING DEVICE

Leon Paul Black, Cliffside Park, N. J.

Application October 30, 1945, Serial No. 625,639

18 Claims. (Cl. 125—11)

This invention relates to grinding wheel truing devices.

In tool rooms certain kinds of work done on surface grinding machines, such as grinding forming tools for automatic screw machines and gauges, requires angles of different degrees, which is accomplished either by holding the work at the required angle in relation to the straight cylindrical grinding wheel, or the wheel's side or periphery is trued to the required angle so that when the work is ground with the wheel so formed it will have an identical angle. Frequently, the same piece of work requires different angles, varying from 0° to 90° on either side of the perpendicular line, in combination with other horizontal grinding surfaces of different width and of different depth, in the form of steps, from which the angular surfaces must diverge within specified precise dimensions.

This type of work is held directly on the magnetic table of the surface grinding machine whenever possible, or is held in a vise, or clamped to an angle plate, and various settings and resettings of the work at different angles in relation to the straight grinding wheel is not only difficult, but are time-consuming operations. Inaccuracies are likely to occur in the process of various resettings of the work. It is preferable, therefore, not to disturb the work in the first set position until all the grinding surfaces, angular as well as horizontal, have been completed, and this is one important reason why angle truing of the grinding wheel is resorted to. Moreover, when grinding acute angles adjacent and close to other angular or vertical sections of the work, the latter could not be set at that angle relative to the straight cylindrical grinding wheel, and there would be no other alternative but to true the grinding wheel to the required angle and the work ground by it.

The various methods, however, that have been employed for truing the grinding wheel at an angle have not proved successful because the truing means applied proved inconvenient in use and because the angle was seldom found to be exact according to specifications when the work was examined under a microscope or in a shadow projector, both now in general use in modern tool-inspection rooms. Trial cuts on the work, therefore, had to be made; the results indicating the necessary adjustments required in the truing device and the wheel trued again and after another cut on the work it had to be again examined under the microscope to determine if the angle is correct or if further adjustments are required.

It is an object of the present invention to provide an instrumentality by means of which any desired angle can be accurately formed on grinding wheels with a minimum effort.

Another object of the invention is the provision of a device which will true a grinding wheel to any angle from 0° to 90° at either side thereof with perfect accuracy by employing the principles of trigonometric functions of angles, by means of which the device may be set or adjusted precisely, and a high degree of accuracy assured in the finished product.

A further object of the invention is the provision in an instrument of this character for controlling the proper position of a diamond point for truing a grinding wheel at a predetermined angle, including means for adjusting the diamond point to the predetermined angle and moving it in this path with reference to the center of rotation of the grinding wheel to true the wheel accordingly.

Another object of my invention is the provision with a suitable form of support of cooperating elements including a member capable of being set at the desired angle and a sine-bar positioned thereby which fixes the angular position of the cutter, together with means for reciprocating the cutter in the path thus set.

My invention also has for its further object to provide, in conjunction with the member which governs the position of the sine-bar, a plurality of fixed stops, one or another of which may be used alternately to meet the requirements of the more frequently used angles for grinding wheels and to supply for use in conjunction therewith, and also in conjunction with the sine-bar, interchangeable elements by means of which other angular settings in great variety may be obtained quickly and accurately.

To these and other ends my invention embodies further improvements, all as will be fully described in the accompanying specification, the novel features thereof being set forth in the appended claims.

In the drawings:

Fig. 1 is a side view of a sine-bar grinding wheel truing device, which is adapted to be held on the magnetic table of a surface grinding machine.

Fig. 2 is a vertical longitudinal section of the device, showing details of construction and its relation to a grinding wheel.

Fig. 2a is a side elevation of one of the stop pins.

Figs. 3, 4 and 5 are vertical views looking toward the face of the support and showing diagrammatically the relative positions of the angle setting member and its cooperating stops, together with the sine-bar in various positions of angular adjustment.

Figs. 6 and 7 are diagrammatic illustrations showing additional settings of the parts depicted in Figs. 3 to 5.

Figs. 8, 9 and 10 are additional diagrams illustrating the use of auxiliary elements for use in setting the angle control member and sine-bar in positions of angular settings.

Figs. 11, 12 and 13 each show in plan and side elevation forms of the auxiliary members which may be used in connection with the sine-bar.

Figs. 14, 15 and 16 each show in plan and side elevation additional auxiliary members for use with one or another of the setting pins for locating the angle controlling member in various positions.

Fig. 17 is a cross-sectional view taken on the line 17x—17x of Fig. 2a, illustrating the grooves controlling the longitudinal and rotational movement of the setting pins.

Fig. 18 is a face view of a lock washer.

Similar reference characters in the several figures illustrate similar parts.

To overcome the difficulties heretofore experienced in truing grinding wheels and to provide a truing instrument by means of which any desired angle can be formed on a grinding wheel, I have provided one comprising a base member or support 1 having a foot portion provided with a flat bottom surface 2, which enables it to be held securely on the magnetic table of a surface grinding machine in the desired position, with reference to the grinding wheel W, one or another of the surfaces of which are to be trued. The support is also provided with a vertically extending face 3 on its forward side, and at its upper end is a head 4 in which is mounted a horizontal shaft 5 carrying the truing cutter and the mechanism for setting and operating it. Mounted on the shaft 5 against the face 3 is an arm 6 which is secured to the shaft by a pin 5$^a$ so that when the arm is rocked the angular position of the shaft and the parts carried thereby will be determined. The arm 6 constitutes the sine-bar and mounted on its hub extension 6$^a$ is a freely swinging or floating segment, hereinafter designated the angle setting member, indicated by 7. The shaft 5 is provided with an annular shoulder 5$^b$ which bears against the arm 7 and at its rear end carries a thumb screw 8 which may be tightened against a non-rotatable washer 9 to lock the aforementioned parts in their adjusted position. At an intermediate point in its length the shaft is grooved, as indicated at 5$^c$, to receive the inner end of a set screw 5$^d$ by means of which, in addition to the thumb screw 8, the shaft may be immobilized.

The forward projecting end of shaft 5 carries a spherical head 10, having a transverse bore in the plane of the center line of the sine-bar 6, and a cylindrical outer end 11 on which is journaled a bevel gear or pinion 12, held in place by the head 12$^a$ of a screw tapped into the extremity of the shaft end 11 lying within the pinion 12. This pinion is operated to advance or retract the truing tool by means of a hand crank 12$^b$ secured to its hub by a pin 12$^c$.

Extending through the bore in the spherical head 10 is the tool carrying mechanism, comprising a sleeve 13 which is held rigidly by a set screw 13$^a$ threaded within the shaft end 11, said sleeve forming a guide for a longitudinally movable tool bar 14. The lower end of the sleeve 13 is provided with an annular shoulder 13$^b$ and between it and the lower side of spherical head 10 there is journaled a bevel pinion 15 meshing with pinion 12, and rotating therewith is a cap nut 16, which embraces its hub and is locked thereto by a set screw 16$^a$. The upper end of the cap nut has a key 16$^b$ which engages in a milled groove in hub of gear 15 (see Fig. 1). This connection insures a positive rotation of the cap nut as the direction of rotation of said gear is alternated to advance or retract the tool bar. The lower half of the length of the tool bar 14 is threaded and in engagement with the cap nut and its outward movement is limited by the stop screw 14$^b$ which will engage with the bottom of the cap nut 16, as shown in Fig. 2. Rotary movement of the tool bar is prevented by a key 17 carried in sleeve 13 and lying in a groove or key way in the bar. It will be seen from this arrangement of the parts that, in accordance with the direction of rotation of the crank 12$^b$, the tool bar may be advanced or retracted as desired.

At its outer end the bar 14 is provided with a head 14$^c$ and extending transversely thereof is a short rod 14$^d$ studded at its ends with diamond points 18—18$^a$, said rod being removably held in place by a set screw 14$^e$.

In wheel truing operations, a considerable amount of abrasive material is liberated in the form of dust and, in order to protect the above described mechanism, I provide a suitable casing 19, preferably made in half sections of plastic or other suitable material, which enclose the gears 12 and 15. These parts bear against the shoulder 5$^b$ of the shaft 5 and fit in a groove in the upper end of the sleeve 13. These half sections are held together in any suitable manner, such as by screws passing through ears on their meeting edges, as will be understood.

By reason of the movability of the tool bar 14, I provide a collapsible and elongatable tubular sheath 20 of a rubberized material, the extremities of which are wired in place in grooves formed in the head 14$^c$ of the bar and the upper end of the sleeve 13. Likewise the lower end of the bar and the cap nut 16 are protected by a dust cover 21 which may also be used as a receptacle for oil for lubricating said parts.

*Angle setting mechanism*

In the foot piece of the support or frame 1, and located at a predetermined radial distance from the center of shaft 5 and from each other, are a plurality of stop pins, three being shown for convenience in description and illustration. These are indicated by 25, 26 and 27, the first being directly below or perpendicular to the shaft 5, and the others at points 15° to the left and right thereof (see diagrammatic figures), and located on an arc which is beyond the arc of movement of the sine-bar 6. Since but one of these pins is used at a time, and where one of them is operated it is to be rotated a quarter turn, I provide them with knurled knobs for retracting them with reference to the face 3 of the support, and provide each with a longitudinal groove 28 at the rear end of which is a 90° groove 29 (Fig. 17), both the slot and groove cooperating with the inner end of a screw 30 threaded into the support, as shown in Fig. 2.

The aforesaid pins form part of the angle setting mechanism which determines the angle of operation of the tool bar carrying the diamond points. The outer ends of these pins cooperate with a central elongated opening which may be in the form of a slot 31 in the lower end of the floating segmental arm 7 and also with its lateral edges. Since the sides of this slot and the ends of the pins are close fitting, I make this elongated opening a little deeper than the circumferences of the pins call for and, to insure the easy engagement of the pins therewith, I flatten them on two sides, as indicated by 32 (Fig. 2ª), which when rotated a quarter turn insures the arm 7 being firmly locked against any play. I consider this flattening of the ends of the pins and the location of these portions with reference to the slots 28 in the pins important and I locate them so that the "flats" will extend radially of the axis of shaft 5 and hence parallel to the walls of the slot 31, whenever the pins are to be moved longitudinally in either direction. This arrangement, it will be seen facilitates the engagement of the pins with the slot 31 since both the width of the latter and the major diameter of the engaging ends of the pins are made to fit very accurately. Another point in this construction is the requirement that the pins must be rotated a quarter turn before they can be retracted as this insures their being properly positioned upon retraction for their next insertion and the 90° arc of the slot 29 insures the full diameter of a pin being positioned crosswise of slot 31. These locking connections, it will be observed, are located below the extremity of the sine-bar 6.

The angular setting of the shaft 5 is effected by the cooperative action of the floating segment 7 and the sine-bar 6 by providing the former with radially disposed lateral edges or surfaces 7ª—7ᵇ and the latter with a stud 60.

The relative sizes and the distances between parts forming this mechanism may, of course, be varied, but for better understanding of their operation, certain fixed dimensions and distances between parts are arbitrarily assumed, as by means of specific examples and figures the description of the working of the device will be greatly simplified and more readily understood.

Accordingly, it shall be assumed that the length of the sine-bar, i. e. the distance between the center of shaft 5 and the center of stud 60 is exactly two inches; that the distance between said shaft center and the centers of the sliding stop-pins 25, 26 and 27 is exactly two and one-half inches; and that the angular center distance between stop-pins 25 and 26 and between 25 and 27 is equal to 15°; also that the diameter of stud 60 is equal to twice the sine 5°×2″ (.08716×2″×2) or .3486″, and the diameters of stop-pins 25—26—27 are equal to twice the sine 5°×2½″ (.08716×2½″×2) or .4358″ and, finally, that the angular width of the floating segment 7, i. e. the angular distance between its sides 7ª and 7ᵇ, is exactly 35°, all as clearly shown in Figs. 3, 4 and 5.

Therefore, it will be seen that when the side 7ᵇ of the floating segment is brought to bear against the right side of the stop-pin 25 or the side 7ª against the left side of the same stop-pin and the stud 60 of the sine-bar is in pressed contact with either side 7ª or side 7ᵇ, as the case may be, the sine-bar and also the sliding tool bar 14 will be in the true vertical position, or at 0°.

By examination of Fig. 3 it will be seen that the stud 60 and stop-pin 25 both occupy the same angle of 10°, but the latter is of larger diameter, because it is located at a distance farther than said stud from the center of the shaft 5. Hence, the side 7ª of the angle setting member 7 is in contact with the left side of both the stud 60 and the stop-pin 25, and the sine-bar 6 and the sliding rod or tool bar 14 are both in true vertical position. However, if the position of the floating segment 7 be left undisturbed, but the stud 60 be brought in contact with the opposite side 7ᵇ of the floating segment 7, as shown in dotted lines at 60ˣ, the position of the sine-bar 6, and hence of the tool bar 14, would now be at 45°, thus giving two complementary angular settings with one position of the angle determining member.

With the elements in position shown in this Fig. 3, the operator holds with one hand the side 7ª of the floating segment 7 in pressed contact with both the sliding stop-pin 25 and the stud 60 of the sine-bar, for the 0° setting, or the stud 60 is held in pressed contact against the side 7ᵇ and the side 7ª against pin 25, for the 45° setting, while with his other hand he tightens the clamping screw 5ᵈ and the thumb screw 8, to secure the position of the parts in operation.

If the above described angular setting of the instrument is the one at which it is desired to dress or true one of the faces of a grinding wheel, the latter is adjusted relatively to the truing instrument to bring the face to be dressed into engagement with the proper diamond point 13. This is accomplished by manipulation of the longitudinal and cross feeds of the grinding machine per se, as will be understood. Following this adjustment of the grinding wheel, the operator, by rotating the hand crank 12ᵇ, causes the diamond point to traverse the grinding wheel as many times as may be required to effect a cut to the desired depth.

The depth of the cut, or rather the width of the angle produced on the grinding wheel, is controlled either by manipulation of the vertical slide of the grinding machine which will advance the wheel toward the diamond or the cross-feed of the machine bed, which will advance the diamond toward the rotating wheel, as desired, after each reciprocation of the tool bar 14.

An illustration of the facility of adjustment is also shown in Fig. 3. There in full lines the right hand diamond point is shown in position to dress the left hand face of wheel W perpendicularly. Should it be desired to dress the opposite face of the wheel at an angle of 45°, it is merely necessary to loosen the locking device 5ᵈ and 8 of shaft 5 and swing the sine-bar 6 over until its stud 60 engages the surface 7ᵇ of the angle setting member, as shown in dotted lines at 60ˣ. Thus, it will be seen that, with each setting of the angle setting member 7, the wheel dressing points may be positioned in two different complementary angular positions.

In Fig. 4 the floating segment is shown astride and locked by the center stop pin 25, so that in this position its opposite edges are at equal angles at opposite sides of a vertical line passing through the axis of shaft 5. It being recalled that its opposite edges are on radii 35°, it will be seen that when the sine-bar stud 60 is in engagement with the surface 7ᵇ the axis of the tool bar is 22°—30′ to the right of the zero or perpendicular plane and that when the sine-bar is adjusted to position its stud against the face 7ª said bar will be thrown into a plane 22°—30′ to the left of the zero or perpendicular.

Another tool setting is shown in Fig. 5 to illustrate the operation when the floating segment is in cooperation with one of the side pins, in this instance the pin 26. Now with the sine-bar stud 60 in engagement with the surface 7ª, the plane in which the tool bar 14 may be reciprocated lies at an angle of 7°—30' to the left of the vertical, whereas if the sine-bar is set to engage its stud with the surface 7ᵇ, the tool bar will be located in a plane 37°—30' to the right of the zero or vertical plane, as shown in dotted lines.

Other angular settings may be attained by engaging one or the other of the converging sides 7ª or 7ᵇ of the angle setting member with one side or the other of the locating pins 25, 26, 27 and such adjustments are shown particularly in Figs. 6 and 7. In Fig. 6 the surface 7ª rests against the left hand side of pin 26. Now with stud 60 also in engagement with surface 7ª, as shown in full lines, the angularity of the tool bar will be 15° to the right of the perpendicular, whereas if said stud is brought to rest in the dotted line position, the position of the tool bar will be in a plane 60° to the right of the perpendicular.

In Fig. 7 the member 7 occupies a position with its surface 7ᵇ in contact with the right hand side of pin 26. With the angle setting member thus fixed and the sine-bar stud in the full line position in contact with surface 7ª, the cut to be made will be at an angle of 30° to the left of the perpendicular, whereas by shifting the sine-bar to position its stud against the surface 7ᵇ the cut will be made at an angle of 15° to the right of the zero plane.

The foregoing illustrates the wide range of settings made possible by the use of a few relatively movable parts whereby I am able to set the instrument to cut surfaces on the angles most frequently used at either side of the perpendicular, viz. 0°; 7°—30'; 15°; 22°—30'; 30°; 37°—30'; 45°, and 60°. However, it will be understood that these may be varied ad infinitum by using additional floating segments, or angle setting members 7 in which the side faces are otherwise disposed as, for instance, at angles of 25° or 55°, or by increasing the number of stop pins and so disposing them as to provide different angle values.

A means which I have devised for rendering the described instrument adaptable to any other degree, as well as fractions thereof, while maintaining the simplicity of the parts depicted in Figs. 1 and 2, comprises the use of auxiliary rings or blocks which may be slipped on the sine-bar stud, or applied to the ends of the angle setting pins, and used either singly or collectively, in these positions. Examples of the operation of such devices are given in Figs. 8 and 9, and said elements are illustrated in Figs. 11 to 16.

A set of the auxiliary elements for use on the sine-bar stud 60 comprises a circular disc 70 (Fig. 11); a rectangular block 62 (Fig. 12); and yoke pieces 63 (Fig. 13), the first two having holes and the third a slot accurately fitting the stud 60. The corresponding elements 70, 62ª and 63ª for use on the angle setting pins 25, 26 and 27 are of similar design with the exception that each of these parts is provided with a hub at its inner side sufficiently long so that when applied to a pin they will lie in the path of movement of the floating segment, or angle setting member 7 for engagement with one or the other of its edges 7ª or 7ᵇ.

The outside diameters of the discs of Figs. 11 and 14 and the widths of the oblong blocks are accurately ground to the sine of the angle in accordance with the identification degree markings on each of them, such as those shown in the drawings, ranging from 3° to 10° in steps of single degrees.

For the purpose of emphasizing both the adaptability of a grinding wheel truing instrument embodying my invention and the advantages found in using the above described auxiliary elements, I have shown in Fig. 10 the use of Johannsen blocks 75 employed between one of the sides 7ª of the angle setting member and the sine-bar stud 60, although such might be inserted between the face 7ᵇ of said member and the pin 26 by means of which any desirable angular setting may be obtained. In the example given, the angular adjustment of the tool bar is arbitrarily taken as 41°—29' (Fig. 10) to accomplish which the angle setting member is set first to position the sine-bar for a 30° angle. Second, a trigonometric table is consulted to learn the sine for the angle 11°—29', which is .19908, and knowing that the distance of stud 60 from the center of shaft 5 is two inches the sine value is doubled and Johannsen blocks to make up the required angle are selected. In this instance, they are .150, .148 and .1002. Third, in this assembled form they must be held in place while the shaft 5 is locked, all of which is a more complicated procedure than the use of the aforementioned auxiliary elements which obviate the second step entirely and contribute to the speedy and accurate setting of the instrument and facilitate its operation by either the method of addition or subtraction.

Two illustrations of the additive method are shown in Fig. 8 one where the ring 70 marked 10° (Fig. 11) is placed on stud 60, the parts having originally been set in the 30° position shown in Fig. 7. The addition of the ring changes the sine-bar position (30°+10°) so that the tool bar is set at a 40° angle at one side of the zero or vertical plane. The second illustration is that of the sine-bar thrown over to the left with the stud (in the dotted line position) carrying a block 63, such as that shown in Fig. 13, with its side marked 3°—15', interposed between the stud and the face 7ᵇ, giving 15°+3°—15', and assuring an angular position of the tool bar of 18°—15'.

A double addition method of operation of the instrument is also possible by the use of two rings or blocks or a ring and a block, as will be observed in Fig. 9. Here, a ring 70, such as that shown in Fig. 11, marked on its face 4°, is placed on sine-bar stud 60 and an oblong block 63ª, such as shown in Fig. 16, is placed on angle setting pin 27 with its side marked 4°—45' against the face 7ª. This block locates the angle setting member so that the 4° ring resting against the other face 7ᵇ so displaces the sine-bar that the tool bar lies at an angle of 38°—45'. This is accomplished thusly: had the radial side 7ª of the angle setting member been in engagement with the left side of pin 27 and stud 60 in engagement with the surface 7ᵇ the sine-bar would have been in a 30° position, but the bar is offset 4° and its controlling member likewise offset 4°—15', which gives 30°+4°—45'+4°.

The foregoing examples make it plain that in an instrument comprehended by my invention, in which innumerable settings can be made for all angles employed in every day machine shop practice, it is quite possible with an auxiliary complement composed of a few rings and blocks, such as described, to obtain angular settings for a tool bar at any angle which it is desired to meet in degrees and minutes from 0° to 90° on either side of a zero or perpendicular plane.

What I claim and desire to protect by Letters Patent is:

1. A grinding wheel truing instrument comprising a rotatable shaft carrying a transversely movable tool bar, a sine-bar attached to the shaft for rotating it to swing the tool bar into elected angular positions of adjustment, an angle setting member journaled on the shaft, having a lateral edge disposed radially of said shaft for fixing the position of the sine-bar, a frame in which the shaft is mounted and a stop pin on the frame disposed with reference to the shaft axis and cooperating with the radial surface of said member.

2. A grinding wheel truing instrument comprising a horizontal rotatable shaft carrying a transversely movable tool bar, an angle setting member loosely mounted on the shaft having a lateral edge extending radially of said axis, a sine-bar fixed to the shaft and movable into and out of engagement with said edge for determining the angular position of the tool bar, a frame supporting the shaft and independently adjustable stops on the frame disposed with reference to the shaft axis, one of which is located in a vertical plane containing the shaft axis and the others at equal angles at each side of said plane, for cooperation with said edge of the setting member to hold it in various positions of angular adjustment.

3. A grinding wheel truing instrument comprising a rotatable shaft carrying a transversely movable tool bar, an angle setting member loosely mounted on the shaft having lateral edges extending radially of said axis, a sine-bar fixed to the shaft and arranged to cooperate with either of said edges for determining the angular position of the tool bar, a frame in which the shaft is journaled and a stop on the frame so disposed with reference to the shaft axis as to cooperate with either of said radial edges.

4. A grinding wheel truing instrument comprising a horizontal rotatable shaft carrying a transversely movable tool bar, an angle setting member loosely mounted on the shaft having lateral edges extending radially of said axis and provided with a central aperture, a sine-bar fixed to the shaft and arranged to cooperate with either of said edges for determining the angular position of the tool bar, a frame in which the shaft is journaled, a stop on the frame cooperating with said aperture to secure said member to position the sine-bar and locate the tool bar alternately at equal angles at opposite sides of a plane perpendicular to the shaft axis.

5. A grinding wheel truing instrument comprising a horizontal rotatable shaft carrying a transversely movable tool bar, an angle setting member loosely mounted on the shaft having lateral edges extending radially of said axis and provided with a central aperture, a sine-bar fixed to the shaft and arranged to cooperate with either of said edges for determining the angular position of the tool bar, a frame in which the shaft is journaled, a stop on the frame capable of cooperating with said aperture or with either of said radial edges of the member, in the first instance serving to cause the tool bar to be located alternately at equal angles, and, secondly, alternately at unequal complementary angles at opposite sides of a plane perpendicular to the shaft axis.

6. A grinding wheel truing instrument embodying a horizontal shaft, a transversely movable tool bar thereon, a sine-bar fixed to the shaft having a stud, an angle setting member loosely mounted on the shaft having lateral edges disposed along radii of said axis, determining the position of said stud and sine-bar to fix the angular position of the tool bar, and provided with a centrally disposed aperture, a frame supporting the shaft, a pin adjustable on the frame disposed beyond the arc of movement of said stud, selectively cooperating with the aperture to hold the member centrally or its sides cooperating with either radial edge of the member to locate it alternately at equal distances off center.

7. A grinding wheel truing instrument embodying a horizontal shaft, a transversely movable tool bar thereon, a sine-bar fixed to the shaft having a stud, an angle setting member loosely mounted on the shaft having lateral edges disposed along radii of said axis, determining the position of said stud and sine-bar to fix the angular position of the tool bar, a frame supporting the shaft, a plurality of pins on the frame, disposed at equal distance from the axis of the shaft and evenly spaced apart beyond the arc of movement of said stud and arranged to cooperate with alternate sides of said member to determine different angular adjustments thereof and of the sine-bar.

8. A grinding wheel truing instrument embodying a horizontal shaft, a transversely movable tool bar thereon, a sine-bar fixed to the shaft having a stud, an angle setting member rotatable about the axis of the shaft having lateral edges disposed along radii of said axis, determining the position of said stud and sine-bar to fix the angular position of the tool bar, a frame supporting the shaft, a plurality of pins on the frame, disposed at equal distance from the axis of the shaft and evenly spaced apart beyond the arc of movement of said stud, each of said pins being of a diameter defined by the arc between the radii projected at opposite sides of said stud, their opposite sides serving to alternately cooperate with the radial edges of the member to locate it at different angles to establish at different times fixed positions for the sine-bar.

9. A grinding wheel truing instrument comprising a frame having a base and a vertically extending face, a shaft journaled on the base at right angles to said face and carrying a thumb screw on one of its ends for locking it against rotary movement, a sine-bar having a hub fixed to the shaft and extending over said face, a movable angle setting member loosely mounted on the hub of the sine-bar and in operative engagement with the sine-bar, means on the base arranged for engagement with said member to fix the angle setting member and sine-bar in various positions of angular adjustment, a tool bar carried on the shaft located in the plane of the sine-bar and means for reciprocating it embodying an operating element carried on the end of the shaft.

10. A grinding wheel truing instrument comprising a frame, a shaft journaled thereon, having an end extending beyond the frame and having a transverse bore, and locking means on the opposite end of the shaft for locking the shaft in adjusted position on the frame, a sleeve extending through said bore, a tool bar guided in the sleeve and provided with a screw thread, a pinion journaled on the sleeve, a cap nut on the pinion cooperating with said thread and a second intermeshing pinion journaled on the end of the shaft secured to a manually operating crank for alternate rotation to reciprocate the tool bar.

11. A grinding wheel truing instrument comprising a base having a head portion, a horizontal shaft journaled therein carrying a reciprocatable tool bar, an angle setting arm depending from the shaft and movable transversely to a vertical plane extending through the axis of the shaft, said arm having opposite edges converging along radii extending from the center of the shaft and means on the base for securing the angle setting arm in its adjusted position, a sine-bar fixed to the shaft having a stud for engagement with either edge of the arm to fix the operational angle of the tool bar at a selected angle extending at either side of said vertical plane and means on the frame and on the end of the shaft for locking the shaft in its adjusted position.

12. A grinding wheel truing instrument comprising a frame having a head, a shaft journaled therein having an end projecting beyond said head and provided with a transverse bore, and means on the frame and on the end of the shaft for locking the shaft in various positions of angular adjustment to the frame, a sleeve secured in said bore carrying a bevel pinion, a threaded tool bar guided and held against rotational movement in the sleeve, a cap nut on said pinion having a threaded engagement with the thread on said bar, a second pinion meshing with the first mentioned pinion and journaled on the end of the shaft and a hand crank attached to the last mentioned pinion.

13. A grinding wheel truing instrument comprising a frame, a horizontal shaft journaled therein having an end portion provided with a transverse bore, a sleeve secured therein carrying at its lower end one of a pair of bevel pinions, the other being mounted on the end of the shaft, a tool bar guided in the sleeve having a threaded end, a cap nut thereon having connection with the first mentioned pinion and a flexible dust guard surrounding the upper end of the bar beyond the end of said sleeve.

14. A grinding wheel truing instrument comprising a frame, a horizontal shaft journaled therein having an end portion provided with a transverse bore, a sleeve secured therein carrying at its lower end one of a pair of bevel pinions, a tool bar extending through the sleeve and having a lower threaded end, a cap nut carried by said pinion having a threaded connection with the lower end of the bar, the other pinion of said pair being mounted on the end of the shaft, a flexible dust guard surrounding and projecting beyond the upper end of the sleeve and surrounding the exposed end of the tool bar, and a tubular member carried by the cap nut and similarly protecting the lower end of the bar.

15. A grinding wheel truing device comprising a frame, a shaft journaled therein at one end and having a free end provided with an enlargement, a sleeve extending transversely therethrough carrying a bevel pinion at its lower end, a tool bar in the sleeve having a threaded end, a cap nut thereon connected to said pinion, an intermeshing pinion carried on the free end of the shaft, a flexible dust collar secured to the upper end of the sleeve for protecting the extending end of the bar, a tubular member carried by the first mentioned pinion and forming a second dust guard protecting the lower end of the tool bar and a dust protecting cover carried on the shaft and enclosing its free end portion and said bevel pinions.

16. A grinding wheel truing device comprising a frame, a shaft journaled therein having a projecting free end, a sleeve extending transversely therethrough carrying a bevel pinion at its lower end, a cap nut embracing the hub of the pinion and secured thereto, a tool bar in the sleeve having a threaded connection with the cap nut, an intermeshing pinion carried on the end of the shaft, a flexible dust cover secured to the upper end of the sleeve for protecting the upper end of the tool bar, a tubular casing carried by the cap nut for protecting the lower end of the tool bar and a dust protecting cover carried on the shaft and enclosing the free end of the shaft and said pinions.

17. A grinding wheel truing instrument embodying a supporting frame, a rotatable shaft thereon carrying a transversely movable tool bar, an angle setting member journaled on the shaft having an opening centrally located at a distance from the shaft, a plurality of locking pins movable transversely of the setting member for selective engagement with said opening arranged for locating the member in a variety of predetermined angular positions in respect to the vertical plane extending through the axis of the shaft, a sine-bar secured to the shaft carrying a stud adapted for engagement with one or the other side of the setting member to fix the operative position of the tool bar, and means on the frame and on the end of the shaft for locking the latter, the sine-bar and the tool bar in the set position.

18. A grinding wheel truing instrument embodying a supporting frame, a rotatable shaft thereon carrying a transversely movable tool bar, an angle setting member journaled on the shaft having an elongated opening located at a distance from the shaft, a cylindrical pin guided on the frame for both longitudinal and rotary movement having an end in engagement with the sides of said opening to fix the operative position of the setting member, said end having a reduced diameter which when the pin is partially rotated facilitates its insertion in said opening, and a sine bar on the shaft cooperating with the angle setting member to fix the angular position of the tool bar.

LEON PAUL BLACK.

REFERENCES CITED

The following references are of record in the file of this patent:

UNITED STATES PATENTS

| Number | Name | Date |
|---|---|---|
| 1,237,001 | Webber | Aug. 14, 1917 |
| 1,388,308 | Rogers | Aug. 23, 1921 |
| 2,068,611 | Schuberg | Jan. 19, 1937 |
| 2,127,614 | Parker | Aug. 23, 1938 |
| 2,162,267 | Thurlow | June 20, 1939 |
| 2,336,758 | Statia, Sr. | Dec. 14, 1943 |
| 2,343,637 | Bochenek | Mar. 7, 1944 |
| 2,355,020 | Turrettini | Aug. 1, 1944 |
| 2,406,043 | Sorensen | Aug. 20, 1946 |

FOREIGN PATENTS

| Number | Country | Date |
|---|---|---|
| 389,762 | Great Britain | Mar. 23, 1933 |